(12) United States Patent
McAuliffe

(10) Patent No.: US 10,518,536 B2
(45) Date of Patent: Dec. 31, 2019

(54) CAPPING ASSEMBLY FOR INKJET PRINTHEAD

(71) Applicant: Memjet Technology Limited, Dublin (IE)

(72) Inventor: Patrick McAuliffe, North Ryde (AU)

(73) Assignee: Memjet Technology Limited (IE)

( * ) Notice: Subject to any disclaimer, the term of this patent is extended or adjusted under 35 U.S.C. 154(b) by 0 days.

(21) Appl. No.: 15/894,024

(22) Filed: Feb. 12, 2018

(65) Prior Publication Data

US 2018/0229503 A1 Aug. 16, 2018

Related U.S. Application Data

(60) Provisional application No. 62/459,513, filed on Feb. 15, 2017.

(51) Int. Cl.
*B41J 2/165* (2006.01)
*F16J 3/04* (2006.01)
*F16J 15/04* (2006.01)

(52) U.S. Cl.
CPC ............. *B41J 2/16511* (2013.01); *F16J 3/04* (2013.01); *F16J 15/04* (2013.01); *B41J 2002/16514* (2013.01)

(58) Field of Classification Search
CPC ............ B41J 2/16511; F16J 3/04; F16J 15/04
See application file for complete search history.

(56) References Cited

U.S. PATENT DOCUMENTS 6,406,124 B1 * 6/2002 Davis .................. B41J 2/16511
347/29
2014/0063119 A1 * 3/2014 Dumas ................ B41J 2/16532
347/30

* cited by examiner

*Primary Examiner* — Bradley W Thies
(74) *Attorney, Agent, or Firm* — Cooley LLP

(57) ABSTRACT

A capping assembly includes a capper having a perimeter seal for sealing engagement with the printhead. The capping assembly has an enclosed capping volume when the capper is sealingly engaged with the printhead, whereby the capping volume is variable in response to relative differences in pressures inside and outside the capping volume.

7 Claims, 3 Drawing Sheets

CAPPING ASSEMBLY FOR INKJET PRINTHEAD

CROSS-REFERENCE TO RELATED APPLICATIONS

The present application claims the benefit of priority under 35 U.S.C. § 119(e) of U.S. Provisional Application Ser. No. 62/459,513, entitled CAPPING ASSEMBLY FOR INKJET PRINTHEAD, filed Feb. 15, 2017, the content of which is hereby incorporated by reference in its entirety for all purposes.

FIELD OF THE INVENTION

This invention relates to a capping assembly for an inkjet printhead. It has been developed primarily to provide a robust seal for an inkjet printhead with minimal vapor losses, whilst facilitating capping and uncapping operations.

BACKGROUND OF THE INVENTION

The Applicant has developed a range of Memjet® inkjet printers as described in, for example, WO2011/143700, WO2011/143699 and WO2009/089567, the contents of which are herein incorporated by reference. Memjet® printers employ one or more stationary inkjet printheads in combination with a feed mechanism which feeds print media past the printhead in a single pass. Memjet® printers therefore provide much higher printing speeds than conventional scanning inkjet printers.

All inkjet printheads need to be capped during non-printing periods to prevent nozzles from drying out. Typically, a printhead capper comprises a compliant perimeter seal engaged with a capping surface of the printhead so as to provide a sealed humid environment for the nozzles. Nevertheless, some drying of the nozzles is inevitable and printers typically perform remedial maintenance operations after uncapping to ensure that the printhead is ready to print. For example, a forced positive pressure prime may be used to unblock any blocked nozzles (see, for example, U.S. Pat. No. 8,845,083, the contents of which are herein incorporated by reference). Additionally or alternatively, the printhead nozzles may eject ink into a spittoon to ensure each nozzle is hydrated and primed with ink.

It is desirable to maximize the humidity of the nozzle environment when a printhead is capped. In this way, the remedial measures required for full nozzle health after uncapping can be minimized. Minimizing such remedial measures not only shortens the 'wake-up' time of the printer, but also reduces the amount of ink consumed for non-printing purposes during spitting and pressure priming.

Notwithstanding the primary requirement for printhead cappers to maximize the humidity of the nozzle environment, cappers paradoxically incorporate a small breather hole (or vent hole), which allows water vapor to escape from the capped volume. The breather hole is deemed necessary in conventional cappers to equalize the pressure of the capped volume with atmospheric pressure. Pressure-equalization prevents a number of undesirable consequences during capper usage e.g. suctioning the capper to the making it difficult to uncap; suctioning excessive volumes of ink from the printhead into the capper; developing overpressure in the capper, which can push ink into the printhead and deprime nozzles etc.

In the absence of a breather hole, overpressure or suction in the capper may be caused by, for example, mechanical movement of the capping and uncapping, temperature changes causing trapped air inside the capper to expand contract, changes in atmospheric pressure etc.

Typically, the breather hole is designed to minimize vapor losses using, for example, a serpentine or labyrinthine path. However, even with such measures, a degree of vapor loss is inevitable over long periods and it would be desirable to minimize vapor losses even further whilst still allowing facile capping and uncapping.

SUMMARY OF THE INVENTION

In a first aspect, there is provided a capping assembly for an inkjet printhead, the capping assembly comprising a capper having a perimeter seal for sealing engagement with the printhead, wherein the capping assembly has an enclosed capping volume when the capper is sealingly engaged with the printhead, the capping volume being variable in response to relative differences in pressures inside and outside the capping volume.

As foreshadowed above, the relative pressure differences may be due to a number of factors, such as changes in atmospheric pressure or temperature changes affecting the pressure inside the capping volume. Advantageously, the capping assembly according to the first aspect equalizes pressures inside and outside the capping volume without requiring a breather hole. Consequently, the capping assembly advantageously minimizes vapor losses from the capping volume when the printhead is capped, whilst mitigating against the deleterious effects of pressure differences e.g. capper suctioning, nozzle deprime, nozzle flooding etc. Accordingly, nozzle health in the printhead is optimized during capped periods and remedial measures after uncapping may be minimized, resulting in reduced ink usage and/or shorter printer wake-up times. The capping assembly is particularly suitable for pagewide printheads in which optimum nozzle health is crucial for single-pass printing so as to avoid print quality defects. However, it will be appreciated that the capping assembly may be used in any suitable inkjet printhead.

Preferably, the capper comprises a rigid capping chamber having a perimeter lip surrounding a mouth of the chamber, the perimeter seal being bonded to the perimeter lip.

Preferably, the capper comprises an absorbent material disposed in the capping chamber.

Preferably, the capping assembly further comprises a flexible compliance in sealed fluid communication with the capping chamber.

Preferably, the bellows flex in response to relative pressure changes.

In one embodiment, the capping chamber comprises a wall incorporating the flexible compliance.

In a preferred embodiment, the bellows are connected to the capping chamber via a tube, the capping volume comprising an internal volume of the capping chamber, the tube and the bellows. In an alternative embodiment, the bellows form part of the capping chamber, such as an external wall of the capping chamber.

Preferably, the bellows comprise a plurality of concentric portions joined via concertinaed sidewalls.

Preferably, the capping mechanism further comprises a movement mechanism for moving the capper relative to the printhead.

In one embodiment, the capper is movable relative to the bellows. In an alternative embodiment, the capper and the bellows have a fixed positional relationship and are movable together.

In a second aspect, there is provided a printer comprising:
an inkjet printhead; and
a capping assembly comprising a capper having a perimeter seal for sealing engagement with the printhead, wherein the capping assembly has an enclosed capping volume when the capper is sealingly engaged with the printhead, the capping volume being variable in response to relative differences in pressures inside and outside the capping volume.

It will be appreciated that preferred embodiments described herein in connection with the first aspect are, of course, equally applicable to the second aspect.

For the avoidance of doubt, the compliant perimeter seals used in prior art cappers are not configured to vary the capping volume in response to relative pressure changes.

Accordingly, any references herein to flexible compliances, bellows etc in connection with the first or second aspects do not include conventional perimeter seals found in prior art cappers.

BRIEF DESCRIPTION OF THE DRAWINGS

Embodiments of the present invention will now be described by way of example only with reference to the accompanying drawings, in which.

DETAILED DESCRIPTION OF THE INVENTION

Figure 1:
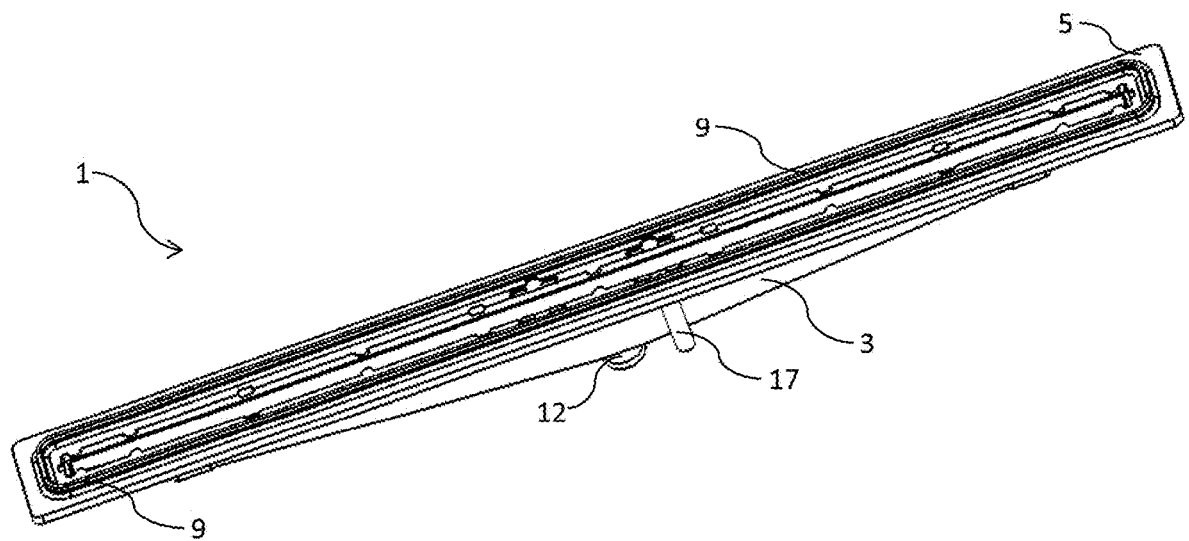
FIG. 1 is a top perspective view of a capper.
Figure 2:
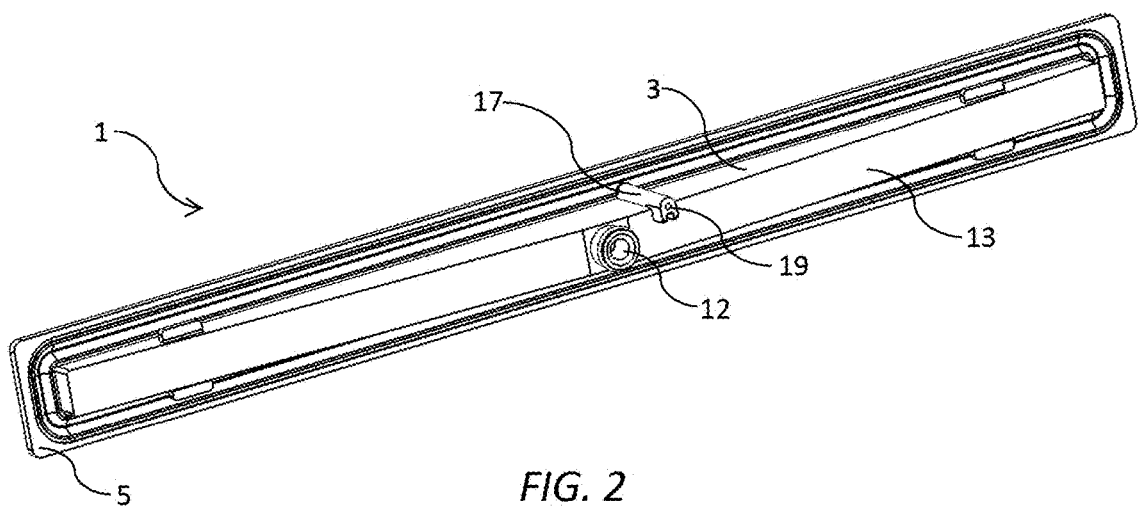
FIG. 2 is a bottom perspective of the capper shown in FIG. 1.
Figure 3:
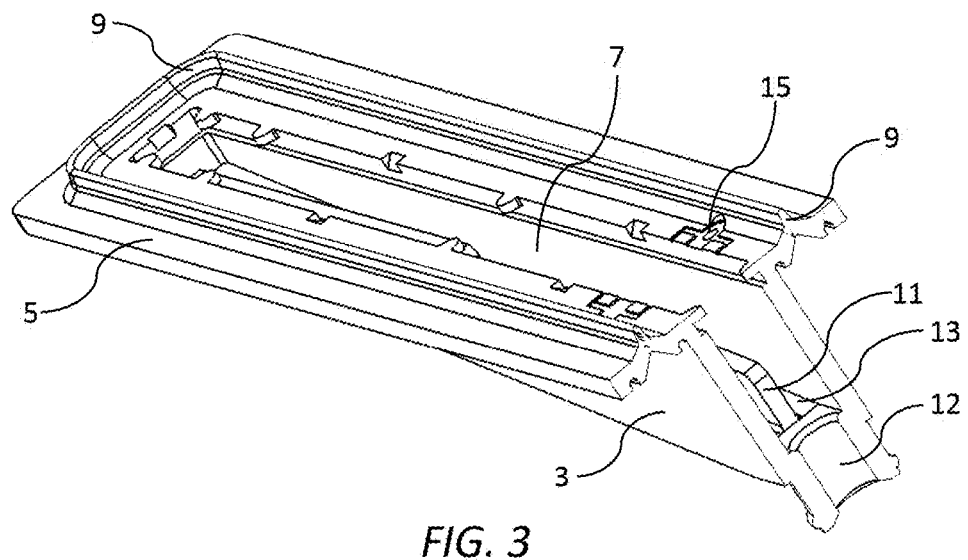
FIG. 3 is a sectional perspective of the capper shown in FIG. 1.

Referring to FIGS. 1 to 3, there is shown a capper 1 for capping a pagewide printhead. The capper 1 comprises a rigid capping chamber 3 having a perimeter lip 5 surrounding a mouth 7 of the chamber. A perimeter seal 9 comprised of a compliant material (e.g. elastomer) is fixed to the perimeter lip 5 of the capping chamber 3. The perimeter seal 9 is configured for engagement with a surface of a printhead (not shown in FIGS. 1 to 3) as is well known in the art.

As shown in FIG. 3, the capping chamber 3 is generally elongate and has an elongate strip of an absorbent material 11 attached to a floor 13 of the chamber. In use, the absorbent material 11 may act as a spittoon by receiving ink droplets ejected from the printhead. The ink retained by the absorbent material 11 assists in maintaining a humid environment within the capping chamber 3 when the printhead is capped. Excess ink within the capping chamber 3 may be drained, either using gravity or suitable pump, via a drainage port 12 extending from the floor 13 of the capping chamber. A valve (not shown) controls opening and closing of the drainage port 12, such that the port is usually closed during capping periods.

Referring to FIGS. 1 and 2, a breather hole 15 is defined in the lip 5 of the capping chamber 3 within the confines of the perimeter seal 9. A breather channel 17 having a breather port 19 extends from the breather hole 15 towards the floor 13 of the chamber. Hence, the breather port 19 is in fluid communication with an internal volume of the capping chamber 3 when the capper 1 is sealingly engaged with a printhead.

In prior art cappers, the breather port 19 has a very small diameter and is simply left open to atmosphere, optionally via a labyrinthine path to minimize vapor losses from the capping chamber 3. However, in a capping system 20, shown schematically in FIG. 5, the breather port 19 is connected via a flexible breather tube 22 to a compliance in the form of a bellows assembly 24, which is closed to atmosphere.

When a printhead 21 is capped by the capper 1 via the perimeter seal 9, the bellows assembly 24 is able to decrease or increase its volume in response to relative pressure changes and, hence, the pressure within a capping volume of the capping system 20 can match external atmospheric pressure. Accordingly, with relatively equalized pressures inside and outside the capper 1, the propensity for overpressures or vacuum pressures to develop inside the inside the capping volume is minimized. The capper 1 may be, for example, be uncapped easily from the printhead 21 even in the absence of a conventional breather hole open to atmosphere.

Moreover, with a sealed capping volume, vapor losses are negligible compared to conventional cappers having a breather hole open to atmosphere. Further, the breather port 19 and breather channel 17 may have any internal diameter since they do not need to be configured for minimizing vapor losses. This provides an additional advantage insofar as small-diameter breather ports and channels are prone to blockages, especially with pigment-based inks.

Figure 5:
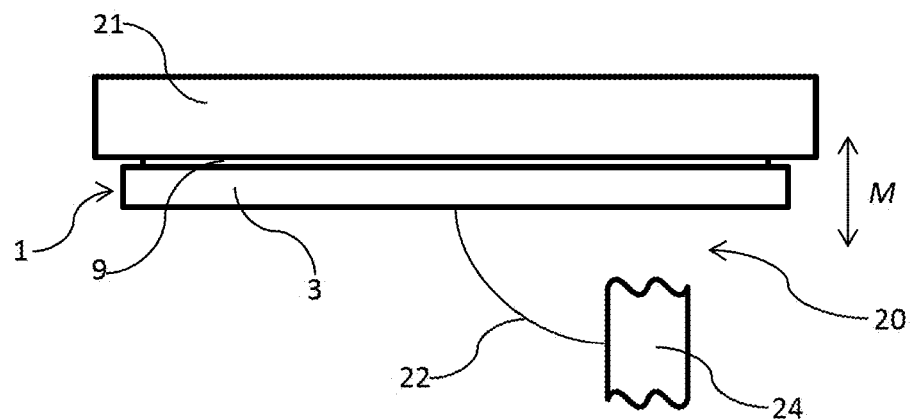
FIG. 5 is a schematic side view of a printhead and capping assembly.

As shown in the FIG. 5, the capping volume incorporates the internal volume of the capping chamber 3, the internal volume of the breather channel and flexible breather tube 22, and the internal volume of the bellows assembly 24.

Figure 4:
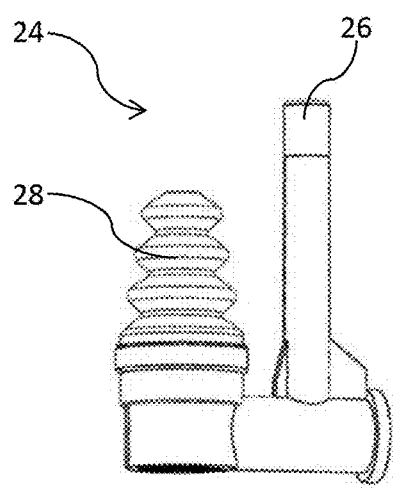
FIG. 4 is a side view of a bellows assembly.

FIG. 4 shows an example of the bellows assembly 24, which may be used in the capping system 20 shown schematically in FIG. 5. An inlet 26 is connected to flexible bellows 28 comprised of a plurality of concentric portions joined via concertinaed sidewalls. However, it will be appreciated that the precise configuration of the bellows 28 may be optimized as appropriate by the person skilled in the art. In some instances, it may be desirable to have a small suction pressure or overpressure inside the capping volume Referring back to FIG. 5, the capper 1 may be moved relative to the inkjet printhead 21 by means of a movement mechanism indicated by arrow M. The capper 1 may be moved reciprocally towards or away from the printhead or laterally relative to the printhead, as will be readily appreciated by the person skilled in the art. The capper 1 and the bellows assembly 24 may be in fixed positional relationship or movable relative to each other during movement of the capper. In some embodiments, the printhead 21 may be movable towards and away from the capper 1 via a respective printhead lift mechanism (not shown).

Figure 6:
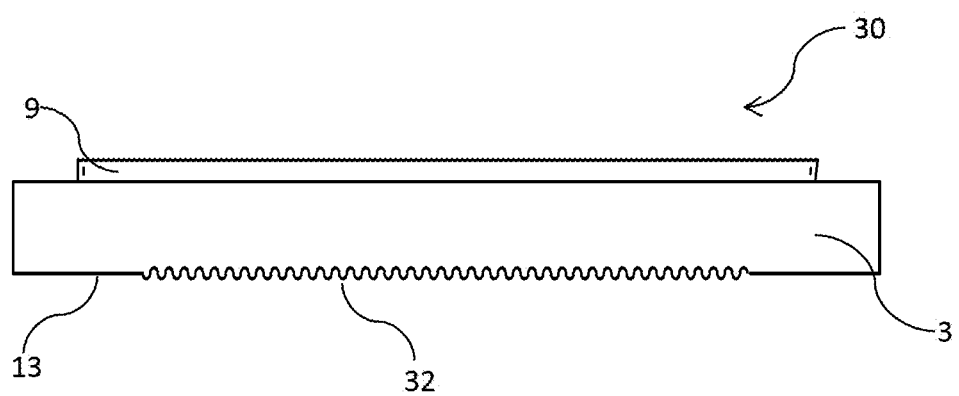
FIG. 6 is a schematic side view of an alternative capping assembly incorporating a compliant wall.

FIG. 6 shows an alternative capping assembly 30, which is able to vary its capping volume in response to relative pressure changes. In the capping assembly 30, the floor 13 of the capping chamber 3 opposite the perimeter seal 9 comprises a compliant wall section 32. The compliant wall section 32 may be comprised of one or more bellows which are able to flex inwards and outwards relative to the capping chamber 3, thereby varying the capping volume in response to pressure changes. Accordingly the capping assembly 30 lacks a breather hole in the capping chamber 3 and vapor losses during capped periods are minimized. The present invention contemplates capping assemblies whereby bellows are external to the capper 1 (FIG. 5) or incorporated into the capper (FIG. 6).

It will, of course, be appreciated that the present invention has been described by way of example only and that modifications of detail may be made within the scope of the invention, which is defined in the accompanying claims.

The invention claimed is:

1. A capping assembly for an inkjet printhead, the capping assembly comprising:
   a capper including a capping chamber having a perimeter seal for sealing engagement with the printhead,
   a drainage port extending from the floor of the capping chamber and a breather port defined in the capping chamber; and
   a bellows assembly external to the capper and connected to the breather port via a flexible breather tube,
   wherein:
   the bellows assembly is always closed to atmosphere when the capper is sealingly engaged with the printhead;
   a capping volume of the capping assembly is variable in response to relative differences in pressures inside and outside the capping volume; and
   the drainage port is configured to be closed during capping periods and open during at least some non-capping periods for drainage of excess ink from the capping chamber.

2. The capping assembly of claim 1, wherein the capping chamber has a perimeter lip surrounding a mouth of the chamber, the perimeter seal being bonded to the perimeter lip.

3. The capping assembly of claim 1, wherein the bellows flex in response to pressure changes.

4. The inkjet printer of claim 1, wherein the bellows assembly comprises a plurality of concentric portions joined via concertinaed sidewalls.

5. The capping assembly of claim 1, further comprising a movement mechanism for moving the capper relative to the printhead.

6. The capping assembly of claim 5, wherein the capper is movable relative to the bellows.

7. A printer comprising:
   an inkjet printhead; and
   a capping assembly comprising:
   a capper including a capping chamber having a perimeter seal for sealing engagement with the printhead,
   a drainage port extending from the floor of the capping chamber and a breather port defined in the capping chamber; and
   a bellows assembly external to the capper and connected to the breather port via a flexible breather tube,
   wherein:
   the bellows assembly is always closed to atmosphere when the capper is sealingly engaged with the printhead;
   a capping volume of the capping assembly is variable in response to relative differences in pressures inside and outside the capping volume; and
   the drainage port is configured to be closed during capping periods and open during at least some non-capping periods for drainage of excess ink from the capping chamber.

* * * * *